US010293250B2

(12) United States Patent
Fukuda et al.

(10) Patent No.: US 10,293,250 B2
(45) Date of Patent: May 21, 2019

(54) GAME DEVICE, GAME SYSTEM, CONTROL METHOD, AND CONTROL PROGRAM

(71) Applicant: SONY INTERACTIVE ENTERTAINMENT INC., Tokyo (JP)

(72) Inventors: Shizuto Fukuda, Tokyo (JP); Shinji Aizawa, Tokyo (JP); Hisao Wada, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 295 days.

(21) Appl. No.: 15/120,281

(22) PCT Filed: Dec. 26, 2014

(86) PCT No.: PCT/JP2014/084609
§ 371 (c)(1),
(2) Date: Aug. 19, 2016

(87) PCT Pub. No.: WO2015/136822
PCT Pub. Date: Sep. 17, 2015

(65) Prior Publication Data
US 2017/0065884 A1 Mar. 9, 2017

(30) Foreign Application Priority Data
Mar. 14, 2014 (JP) .................. 2014-052657

(51) Int. Cl.
A63F 9/24 (2006.01)
A63F 13/323 (2014.01)
(Continued)

(52) U.S. Cl.
CPC .......... A63F 13/323 (2014.09); A63F 13/355 (2014.09); A63F 13/92 (2014.09); G06F 9/50 (2013.01)

(58) Field of Classification Search
USPC ...................................... 463/25–43
See application file for complete search history.

(56) References Cited

U.S. PATENT DOCUMENTS

2004/0196265 A1* 10/2004 Nohr ..................... G06F 1/1626
345/169
2007/0010328 A1* 1/2007 Yokota ................... A63F 13/12
463/42
(Continued)

FOREIGN PATENT DOCUMENTS

JP        8-10445 A     1/1996
JP        9-294260 A   11/1997
(Continued)

OTHER PUBLICATIONS

International Preliminary Report on Patentability and Written Opinion of the International Searching Authority dated Sep. 22, 2016 from corresponding Application No. PCT/JP2014/084609.
(Continued)

Primary Examiner — Masud Ahmed
(74) Attorney, Agent, or Firm — Katten Muchin Rosenman LLP

(57) ABSTRACT

A game device (information processing device (4)) includes a communication unit communicable with a portable terminal (2), an executing unit that executes a game application, a rendering unit that renders a game screen of a game based on the game application, and a switching unit that switches an operating state. The game device is configured to be usable in an independent use form in which the executing unit executes the game application and the rendering unit renders the game screen to cause the game to progress and a task processing form in which the executing unit processes a partial task of a game application executed in the portable terminal (2) and transmits a processing result of the partial task to the portable terminal (2). The switching unit carries (Continued)

out switching to any of the independent use form and the task processing form to cause the game device to operate.

9 Claims, 9 Drawing Sheets

(51) Int. Cl.
    *G06F 9/50*     (2006.01)
    *A63F 13/355*     (2014.01)
    *A63F 13/92*     (2014.01)

(56) References Cited

U.S. PATENT DOCUMENTS

| | | | | |
|---|---|---|---|---|
| 2007/0093294 | A1* | 4/2007 | Serafat | A63F 13/12 463/39 |
| 2009/0131171 | A1* | 5/2009 | Miyazaki | A63F 13/10 463/37 |
| 2009/0143140 | A1* | 6/2009 | Kitahara | A63F 13/12 463/37 |
| 2012/0044177 | A1* | 2/2012 | Ohta | G06F 3/04886 345/173 |
| 2012/0188694 | A1* | 7/2012 | Sakakibara | G06F 1/1626 361/679.01 |
| 2013/0310160 | A1* | 11/2013 | Froy | G07F 17/3218 463/25 |

FOREIGN PATENT DOCUMENTS

| | | |
|---|---|---|
| JP | 2007-528757 A | 10/2007 |
| JP | 2009-131492 | 6/2009 |
| JP | 2012-61301 A | 3/2012 |
| WO | 2005/039719 A1 | 5/2005 |

OTHER PUBLICATIONS

International Search Report and Written Opinion dated Mar. 24, 2015, from the corresponding PCT/JP2014/084609.

* cited by examiner

GAME DEVICE, GAME SYSTEM, CONTROL METHOD, AND CONTROL PROGRAM

TECHNICAL FIELD

The present invention relates to a game device, a game system, a control method, and a control program.

BACKGROUND ART

Conventionally, a game device to which an operation device such as a controller is connected and that causes a game to progress according to input operation to this operation device and causes a connected display device to display a game screen is known (for example, refer to PTL 1). The game device described in PTL 1 is a so-called stationary-type game device, and executes an application according to the above-described input operation to cause a game based on this application to progress.

Furthermore, as such a game device, one having a communication function that can communicate with external equipment in a wired or wireless manner is also known, and this game device is configured to be capable of acquiring content such as a game application from a server on a network for example.

Meanwhile, a portable terminal that is provided with an operation device and a display device on a casing and causes a game to progress according to input operation to the operation device by a processing device provided in this casing is known (for example, refer to PTL 2). This portable terminal also has a communication function that can connect to external equipment in a wireless or wired manner.

CITATION LIST

Patent Literature

[PTL 1]
U.S. Patent Application Publication No. 2009/0131171
[PTL 2]
U.S. Patent Application Publication No. 2012/0188694

SUMMARY

Technical Problem

Incidentally, in the case in which plural players each having a portable terminal attempt to play the same game, it is general to introduce the same application into each of the portable terminals and then play this game with communications among the respective portable terminals or communications by each portable terminal with a server that manages the progression of the game.

Here, the portable terminal is required to be capable of being carried and therefore the size of the casing is comparatively small. In addition, there are limits on power, heat, and so forth. Thus, the processing performance is limited. That is, it is general that the processing performance of the portable terminal is lower than that of the stationary-type game device of the same generation.

However, comparatively-high processing performance is required for games developed in recent years.

For these reasons, a configuration in which the same game can be played at low cost by plural portable terminals and a configuration that enables even a portable terminal to execute an application for which high processing performance is required are demanded.

One of objects of the present invention is to provide a game device, a game system, a control method, and a control program that have enhanced general versatility.

Solution to Problem

A game device according to a first aspect of the present invention is characterized by the following configuration. Specifically, the game device includes a communication unit communicable with a portable terminal, an executing unit that executes a game application, a rendering unit that renders a game screen of a game based on the game application, and a switching unit that switches an operating state. The game device is configured to be usable in an independent use form in which the executing unit executes the game application and the rendering unit renders the game screen to cause the game to progress and a task processing form in which the executing unit processes a partial task of a game application executed in the portable terminal and transmits a processing result of the partial task to the portable terminal. The switching unit carries out switching to any of the independent use form and the task processing form to cause the game device to operate.

As the above-described game device, a stationary-type game device, a personal computer (PC), and so forth can be exemplified. Furthermore, as the portable terminal, a notebook PC, a tablet terminal, a smartphone (multifunction mobile phone), and a portable game machine can be exemplified. Moreover, as the operation device, a controller and a pointing device such as a mouse can be exemplified.

According to the above-described first aspect, in the independent use form, the above-described game device independently executes the game application and the rendering unit renders the game screen to cause the game to progress. Thus, the game can be caused to progress by using the operation device even when the game device does not exist in an environment in which communications with the portable terminal are possible for example.

Furthermore, in the task processing form, the game device processes the partial task of the game application executed by the portable terminal and transmits the processing result of this partial task to the portable terminal. Thereby, the game is played in the portable terminal. According to this, for example, executing processing involving a high load by the game device can reduce the processing load in the portable terminal. Therefore, even an application for which comparatively-high processing performance is required can be executed by the portable terminal. Besides, the power consumption of the portable terminal can be reduced, which allows the portable terminal to be used for a long time.

Furthermore, the switching unit carries out switching to any of these independent use form and task processing form and causes the game device to operate, which can enhance the general versatility of the game device.

In the above-described first aspect, it is preferable that the partial task be at least any of soft real-time processing and processing that periodically occurs. The soft real-time processing refers to processing that does not have a very serious influence on execution of the application even if the processing is not immediately completed.

According to the above-described first aspect, if the above-described partial task processed in the game device is the soft real-time processing, the game can be surely caused to progress in the portable terminal even when the portable terminal cannot immediately acquire the processing result by the game device. On the other hand, if the above-described partial task is the processing that periodically occurs, the game device can wait for the processing of this partial task according to the corresponding cycle. Thus, the processing result can be rapidly transmitted to the portable terminal and the game can be surely caused to progress in this portable terminal.

In the above-described first aspect, it is preferable that the rendering unit have a GPU and the executing unit cause the GPU to execute arithmetic processing included in the partial task.

GPU is an abbreviation of graphics processing units. Here, as the GPU, one that is not only excellent in rendering processing but also more excellent in arithmetic processing than the central processing unit (CPU) is also known.

Thus, in the above-described first aspect, by executing the arithmetic processing included in the above-described partial task by the GPU possessed by the rendering unit, the arithmetic processing result can be rapidly obtained and the processing result of this partial task can be transmitted to the portable terminal in a comparatively-short time. Therefore, it is possible to shorten the time from issuance of the above-described partial task from the portable terminal to the game device to the transmission of the processing result to the portable terminal.

In the above-described first aspect, it is preferable that the executing unit process the partial task by using a processing program acquired from the portable terminal. According to the above-described first aspect, the game device acquires the processing program to process the above-described partial task from the portable terminal and processes this partial task by using this processing program. This can surely process the partial task of the application executed in the portable terminal even when the game device does not hold this processing program. Furthermore, this can extend the width of the task that can be processed in the game device.

A game device according to a second aspect of the present invention is characterized by the following configuration. Specifically, the game device includes a communication unit communicable with a portable terminal, an executing unit that executes a game application, a rendering unit that renders a game screen of a game based on the game application on the basis of rendering information input from the executing unit, and a switching unit that switches an operating state. The game device is configured to be usable in an independent use form in which the executing unit executes the game application and the rendering unit renders the game screen to cause the game to progress and a cooperative processing form in which the executing unit executes the game application and transmits the rendering information to the portable terminal to cause the portable terminal to render the game screen and cause the game to progress. The switching unit carries out switching to any of the independent use form and the cooperative processing form to cause the game device to operate.

The rendering information is the information necessary to render the game screen in the portable terminal. For example, data of objects in the game screen and information on the point of view of the player set in a virtual space and so forth can be cited.

According to the above-described second aspect, as with the above-described first aspect, in the independent use form, the above-described game device independently executes the game application and the rendering unit renders the game screen to cause the game to progress. Thus, the game can be caused to progress by using the operation device even when the game device does not exist in an environment in which communications with the portable terminal are possible for example.

On the other hand, the cooperative processing form is similar to the above-described independent use form in that the executing unit executes the game application. However, this executing unit transmits the rendering information, which is output to the rendering unit to cause the rendering unit to render the game screen, to the portable terminal and causes the game screen based on this rendering information to be displayed on the portable terminal to cause the game to progress. This can reduce the processing load of the above-described rendering unit and hence the game device. Besides, the game can be caused to progress, with the game screen displayed by the portable terminal.

Furthermore, the switching unit carries out switching to any of these independent use form and cooperative processing form and causes the game device to operate, which can enhance the general versatility of the game device.

In the above-described second aspect, it is preferable that the rendering unit have a GPU and the executing unit cause the GPU to execute partial arithmetic processing in processing based on the game application when the game device is used in the cooperative processing form.

As described above, GPU is an abbreviation of graphics processing units.

According to the above-described second aspect, when the game device is used in the cooperative processing form, the GPU of the rendering unit executes the partial arithmetic processing in the processing based on the game application. According to this, because the GPU has high arithmetic processing performance as described above, the result of this partial arithmetic processing can be rapidly acquired and the game can be caused to progress without delay. Furthermore, in the cooperative processing form, the rendering unit does not carry out rendering of the game screen and thus the processing load thereof is comparatively low. Thus, the resources of the game device can be effectively utilized by causing the GPU of this rendering unit to execute the above-described partial arithmetic processing.

In the above-described second aspect, it is preferable that the processing in which the partial arithmetic processing executed by the GPU is included be at least any of soft real-time processing and processing that periodically occurs.

As described above, the soft real-time processing refers to processing that does not have a very serious influence on execution of the application even if the processing is not immediately completed.

According to the above-described second aspect, if the processing in which the partial arithmetic processing executed by the GPU is included is the soft real-time processing, the game based on the game application in execution can be surely caused to progress even when the executing unit cannot immediately acquire the processing result by this GPU. On the other hand, if this processing is the processing that periodically occurs, the GPU can be caused to periodically execute the above-described arithmetic processing and thus the GPU, whose processing load is comparatively small, can be effectively utilized.

In the above-described first and second aspects, it is preferable that the game device be configured to be usable in a game provision form in which the executing unit executes the game application according to operation information received from the portable terminal, and the rendering unit renders the game screen, and the game device transmits the game screen to the portable terminal to cause the game to progress.

According to the above-described first and second aspects, when the game device is used in the game provision form, the executing unit executes the game application according to the operation information received from the portable terminal and transmits the game screen rendered by the rendering unit to the portable terminal to cause the game to progress. This can play the game based on the game application without introducing this game application into the portable terminal. Furthermore, the switching unit carries out switching to any of the independent use form, the task processing form, and the game provision form or any of the independent use form, the cooperative processing form, and the game provision form and causes the game device to operate. This can further enhance the general versatility of the game device.

A game system according to a third aspect of the present invention is characterized by including the game device according to the above-described first aspect or the above-described second aspect and the portable terminal. According to the above-described third aspect, the same effects as those of the game device according to the above-described first aspect or the above-described second aspect can be achieved.

A control method according to a fourth aspect of the present invention is a control method of a game device that executes a game application and is characterized by including a switching step of switching an operating state of the game device between an independent use form in which the game application is executed and a game screen of a game based on the game application is rendered to cause the game to progress and a task processing form in which a partial task of a game application executed in a portable terminal that communicates with the game device is processed and a processing result of the partial task is transmitted to the portable terminal.

According to the above-described fourth aspect, by applying this control method to a game device, the same effects as those of the game device according to the above-described first aspect can be achieved.

A control method according to a fifth aspect of the present invention is a control method of a game device that executes a game application and is characterized by including a switching step of switching an operating state of the game device between an independent use form in which the game application is executed and a game screen of a game based on the game application is rendered to cause the game to progress and a cooperative processing form in which the game application is executed and rendering information necessary in rendering the game screen is transmitted to a portable terminal that communicates with the game device to cause the portable terminal to render the game screen and cause the game to progress.

According to the above-described fifth aspect, by applying this control method to a game device, the same effects as those of the game device according to the above-described second aspect can be achieved.

A control program according to a sixth aspect of the present invention is a control program that is executed by an executing unit of a game device that executes a game application, and switches an operating state of the game device. The control program is characterized by causing the executing unit to execute a switching step of switching the operating state of the game device between an independent use form in which the game application is executed and a game screen of a game based on the game application is rendered to cause the game to progress and a task processing form in which a partial task of a game application executed in a portable terminal that communicates with the game device is processed and a processing result of the partial task is transmitted to the portable terminal.

According to the above-described sixth aspect, through execution of this control program by a game device, the same effects as those of the game device according to the above-described first aspect can be achieved.

Such a control program can be recorded in a recording medium such as magnetic tape, magnetic disk, optical disk, hard disk drive (HDD), and semiconductor memory, and this control program can be installed and executed in the game device by using them.

A control program according to a seventh aspect of the present invention is a control program that is executed by an executing unit of a game device that executes a game application, and switches an operating state of the game device. The control program is characterized by causing the executing unit to execute a switching step of switching the operating state of the game device between an independent use form in which the game application is executed and a game screen of a game based on the game application is rendered to cause the game to progress and a cooperative processing form in which the game application is executed and rendering information necessary in rendering the game screen is transmitted to a portable terminal that communicates with the game device to cause the portable terminal to render the game screen and cause the game to progress.

According to the above-described seventh aspect, through execution of this control program by a game device, the same effects as those of the game device according to the above-described second aspect can be achieved.

As with the above description, such a control program can be recorded in a recording medium such as magnetic tape, magnetic disk, optical disk, hard disk drive (HDD), and semiconductor memory, and this control program can be installed and executed in the game device by using them.

DESCRIPTION OF EMBODIMENT

One embodiment of the present invention will be described below based on the drawings.

[Configuration of Information Processing System]

Figure 1:
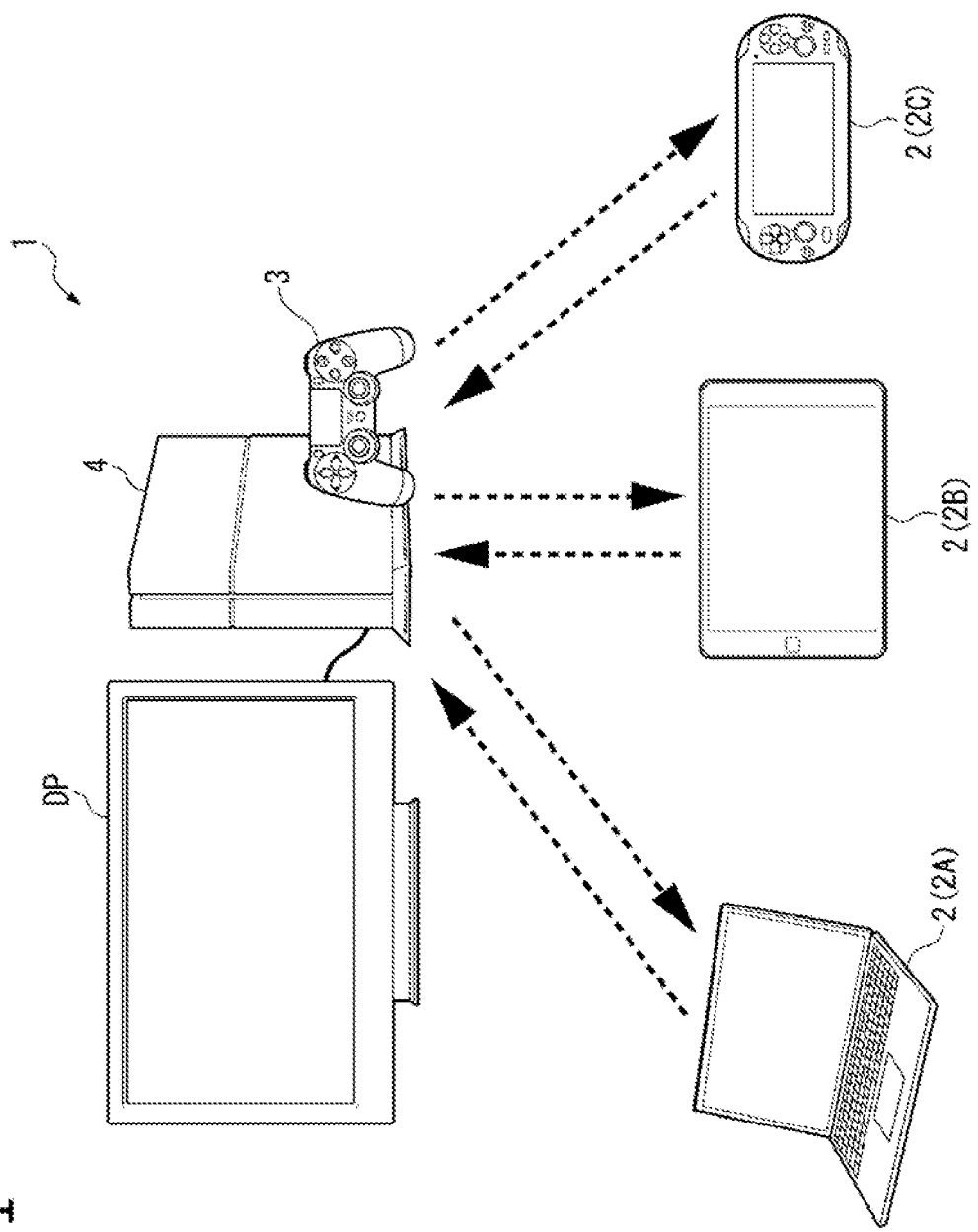
FIG. 1 is a schematic diagram depicting the configuration of an information processing system according to one embodiment of the present invention.

FIG. 1 is a schematic diagram depicting the configuration of an information processing system 1 according to the present embodiment.

The information processing system 1 according to the present embodiment includes at least one portable terminal 2 (in the present embodiment, three portable terminals 2A, 2B, and 2C), an operation device 3, an information processing device 4 operated by the operation device 3, and a display device DP that displays an image according to image information transmitted from the information processing device 4. Of these components, the information processing device 4 executes processing according to operation information received from the operation device 3. Besides, the information processing device 4 communicates with the portable terminal 2 and transmits a predetermined processing result.

The information processing system 1 is configured to be capable of realizing the following four use forms as a game system of the present invention.

A first use form is a use form in which the information processing device 4 becomes a main entity of processing of an application and operates. Specifically, the first use form is a use form in which a user who operates the operation device 3 uses an application (for example, game application) introduced into the information processing device 4. In other words, the first use form is a use form in which the information processing device 4 executes processing according to input operation to the operation device 3 by the user.

A second use form is a use form in which the information processing device 4 becomes a main entity of processing of an application and operates and the portable terminal 2 executes partial processing relating to execution of this application. Specifically, in the second use form, the portable terminal 2 executes rendering processing of an execution screen of the application (for example, game application) executed in the information processing device 4. Specifically, in the second use form, when a user uses an application introduced into the information processing device 4, the information processing device 4 transmits the information necessary for rendering of an execution screen of this application to the portable terminal 2, and the portable terminal 2 renders this execution screen on the basis of the received information and displays this execution screen on the portable terminal 2 or the display device DP.

A third use form is a use form in which the information processing device 4 becomes a main entity of processing of an application and operates as a server and the portable terminals 2 operate as clients. Specifically, the third use form is a use form in which plural users simultaneously use an application introduced into the information processing device 4 by each using the portable terminal 2. For example, the third use form is a use form in which one game application introduced into the information processing device 4 can be simultaneously played by plural persons. Specifically, in the third use form, each of the respective portable terminals 2 carries out communications due to a protocol common with the information processing device 4 and transmits operation information. Besides, each portable terminal 2 receives a processing result including an execution screen of a game from the information processing device 4 and displays this execution screen. Furthermore, the information processing device 4 executes the game application and executes predetermined processing according to the received operation information, and then transmits the processing result including the execution screen to the corresponding portable terminal 2.

A fourth use form is a use form in which the portable terminal 2 becomes a main entity of processing of an application and operates and the information processing device 4 takes over and executes part of processing to be executed in the portable terminal 2. In other words, the fourth use form is a use form in which, when a user uses an application introduced into the portable terminal 2, the information processing device 4 executes part of processing of this application and transmits a processing result to the portable terminal 2. Specifically, in the fourth use form, when the portable terminal 2 executes a game application, the information processing device 4 executes a partial task in this game, and the portable terminal 2 causes this game to progress while receiving a processing result of this partial task from the information processing device 4.

The respective configurations of the information processing system 1 will be described below.

In the following description, the case in which the portable terminals 2 and the information processing device 4 execute a game application as an application will be exemplified. However, the application that can be executed in the information processing system 1 is not limited to the game application.

[Configuration of Portable Terminal]

Figure 2:
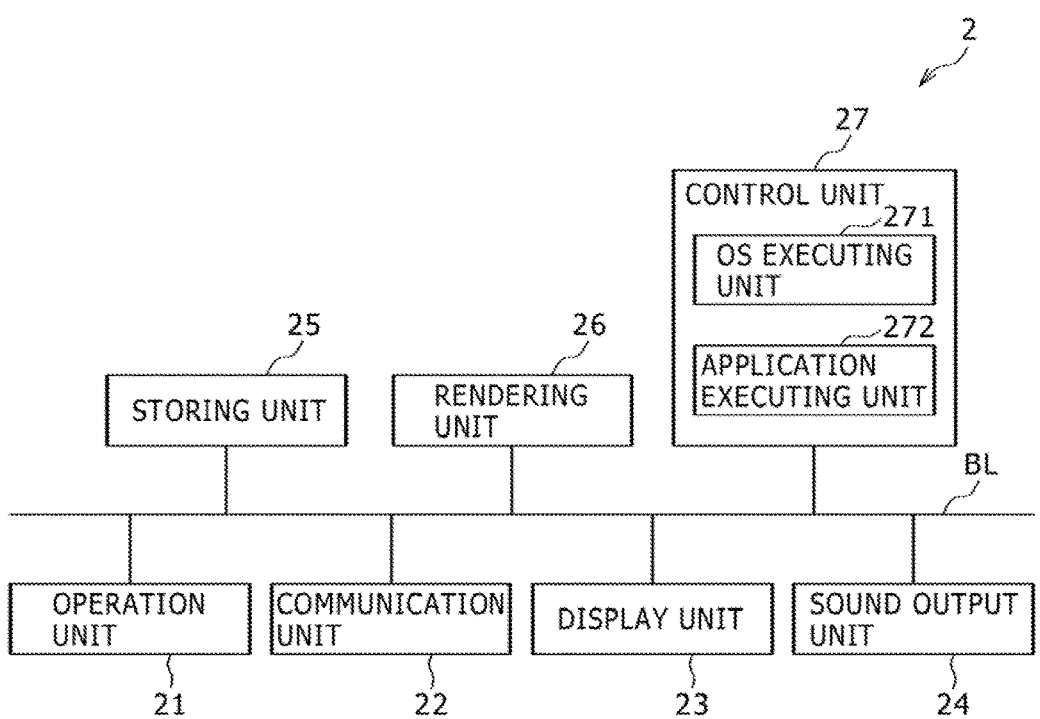
FIG. 2 is a block diagram depicting the configuration of a portable terminal in the above-described embodiment.

FIG. 2 is a block diagram depicting the configuration of the portable terminal 2.

The portable terminal 2 can be configured by the notebook PC 2A, the smartphone 2B, and the portable game machine 2C, and a tablet terminal (not depicted). In the information processing system 1 according to the present embodiment, three portable terminals 2 in total, i.e. the notebook PC 2A, the smartphone 2B, and the portable game machine 2C, are used.

As depicted in FIG. 2, these portable terminals 2 include an operation unit 21, a communication unit 22, a display unit 23, a sound output unit 24, a storing unit 25, a rendering unit 26, and a control unit 27, and they are connected to each other by a bus line BL.

The operation unit 21 outputs an operation signal according to input operation by a user to the control unit 27. As such an operation unit 21, physical keys provided on the casing of the portable terminal 2 (including physical keys provided on a keyboard), a pointing device such as a mouse, and a touch panel provided on a display or the like can be cited.

The communication unit 22 communicates with external equipment such as the information processing device 4 on the basis of connection information stored in the storing unit 25 under control by the control unit 27.

Specifically, the communication unit 22 outputs information received from the external equipment to the control unit 27 and transmits information input from the control unit 27 to the external equipment.

The display unit 23 includes a display of organic electroluminescence (EL), liquid crystal, etc. and displays an image according to an input image signal. The sound output unit 24 includes a speaker and outputs a sound according to an input sound signal.

The storing unit 25 includes a volatile storing unit such as a random access memory (RAM) and a video RAM (VRAM) and a non-volatile storing unit such as a flash memory, a hard disk drive (HDD), and a solid state drive (SSD), although diagrammatic representation is omitted. Of these units, the volatile storing unit provides a working area for the rendering unit 26 and the control unit 27.

The non-volatile storing unit stores programs such as an operating system (OS) that controls the portable terminal 2 and applications and the data necessary for the operation of the portable terminal 2. As such applications, a common protocol application and a task selection application, which will be described later, are cited. Furthermore, as this data, the connection information (internet protocol (IP) address and so forth) necessary when communications are carried out with external equipment via the communication unit 22 is cited.

The rendering unit 26 includes a graphics processing unit (GPU) and so forth and renders an image to be displayed by the display unit 23 in the above-described storing unit 25 under control by the control unit 27. For example, the rendering unit 26 renders an execution screen of OS and application executed by the control unit 27. Furthermore, when the common protocol application to be described later is executed by the control unit 27, the rendering unit 26 renders an image according to image information received from the information processing device 4 via the communication unit 22 and causes the display unit 23 to display this image.

The control unit 27 includes a central processing unit (CPU) and so forth and controls the operation of the portable terminal 2. The control unit 27 includes an OS executing unit 271 that executes the OS stored in the storing unit 25 and an application executing unit 272 that executes an application as functional units. The OS executing unit 271 autonomously controls the portable terminal 2 and controls the portable terminal 2 on the basis of operation information input from the operation unit 21 according to input operation by a user. For example, if an operation signal to cause a predetermined application to be executed is input, the OS executing unit 271 causes the application executing unit 272 to execute the corresponding application.

The application executing unit 272 executes the application ordered by the OS executing unit 271. Furthermore, the application executing unit 272 executes a control program to switch the use form of the portable terminal 2, which will be described later. That is, the application executing unit 272 is an executing unit that executes an application and is also a switching unit that switches the operating state of the portable terminal 2. The case in which the application executing unit 272 executes the above-described common protocol application and the relevant respective use forms will be described in detail later.

[Configuration of Operation Device]

The operation device 3 is an operation device that operates the information processing device 4 as described above and is configured by a controller in the present embodiment as depicted in FIG. 1. The operation device 3 communicates with the information processing device 4 in a wireless or wired manner and transmits operation information according to input operation by a user (player) to the information processing device 4. The operation device 3 is not limited to the controller and may be another pointing device such as a mouse.

[Configuration of Information Processing Device]

Figure 3:
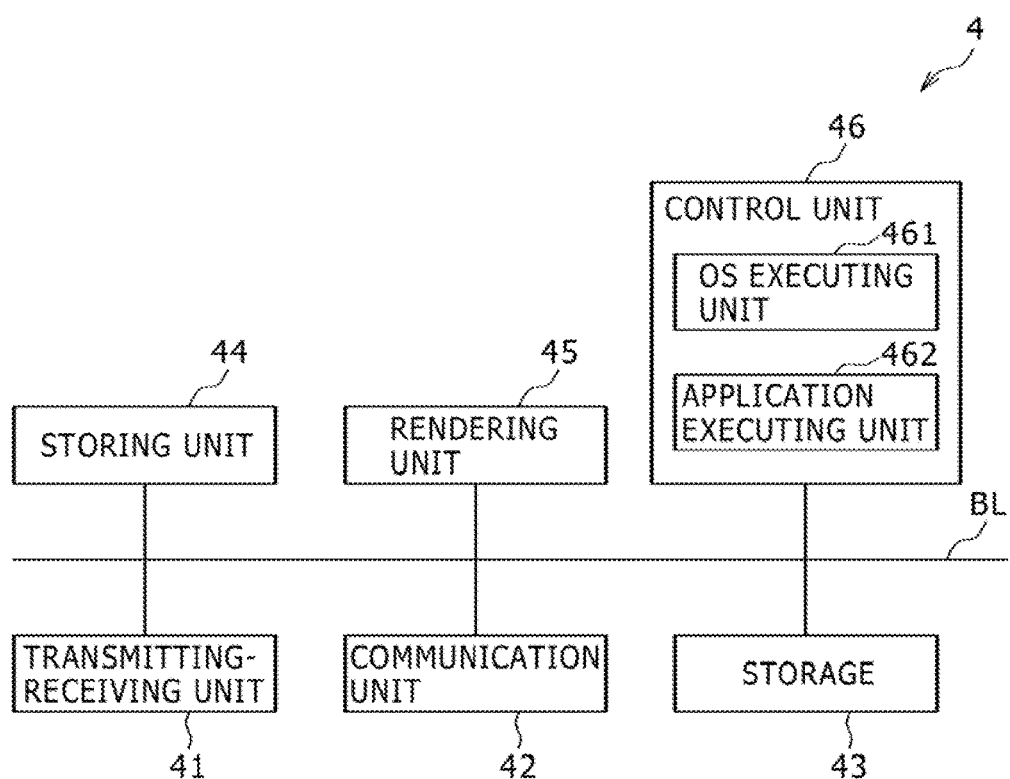
FIG. 3 is a block diagram depicting the configuration of an information processing device in the above-described embodiment.

FIG. 3 is a block diagram depicting the configuration of the information processing device 4.

The information processing device 4 is equivalent to the game device of the present invention. The information processing device 4 is configured by a stationary-type game device, a personal computer (PC), or the like for example and independently executes a held application. Besides, the information processing device 4 is configured to be communicable with the above-described portable terminal 2 and operation device 3.

As depicted in FIG. 3, such an information processing device 4 includes a transmitting-receiving unit 41, a communication unit 42, a storage 43, a storing unit 44, a rendering unit 45, and a control unit 46, and they are connected to each other by a bus line BL.

The transmitting-receiving unit 41 is an interface connected to the above-described display device DP and operation device 3. For example, the transmitting-receiving unit 41 transmits an image rendered by the rendering unit 45 to be described later to the display device DP and outputs operation information received from the operation device 3 to the control unit 46.

The communication unit 42 is a communication module that communicates with the above-described portable terminal 2 under control by the control unit 46. The communications with the portable terminal 2 by the communication unit 42 may be carried out in an ad hoc mode or may be carried out in an infrastructure mode. Furthermore, it is also possible for the communication unit 42 to communicate with a server (not depicted) on a network and download a program (including application) and data from this server.

The storage 43 holds programs such as an operating system (OS) that controls the operation of the information processing device 4, game applications, and a distribution processing application to be described later and various kinds of data. As such a storage 43, a reading device capable of reading at least data from a disk-type recording medium or a memory card and a storing device such as a hard disk drive (HDD) and a solid state drive (SSD) can be exemplified.

The storing unit 44 is configured to include a RAM and a VRAM and provides a working area for the rendering unit 45 and the control unit 46.

The rendering unit 45 includes a graphics processing unit (GPU) and so forth and renders an execution screen of OS and application under control by the control unit 46.

The control unit 46 is configured to include a central processing unit (CPU) and so forth similarly to the above-described control unit 27, and controls the information processing device 4 autonomously or according to operation information received from the operation device 3. The control unit 46 includes an OS executing unit 461 that executes the OS and an application executing unit 462 that executes an application ordered by the OS executing unit 461. When executing the application, the application executing unit 462 executes a control program to switch the use form of the information processing device 4, which will be described later. That is, the application executing unit 462 is equivalent to the executing unit and the switching unit of the present invention.

[Operation of Information Processing System]

The information processing system 1 according to the present embodiment can be used in four use forms (first to fourth use forms) as described above. In other words, the above-described application executing units 272 and 462 switch the operating state of the portable terminal 2 and the information processing device 4, respectively, according to setting operation by a user and the information processing device 4 operates in any of the first to fourth use forms.

The operation of the portable terminal 2 and the information processing device 4 in each use form will be described below.

[First Use Form]

Figure 4:
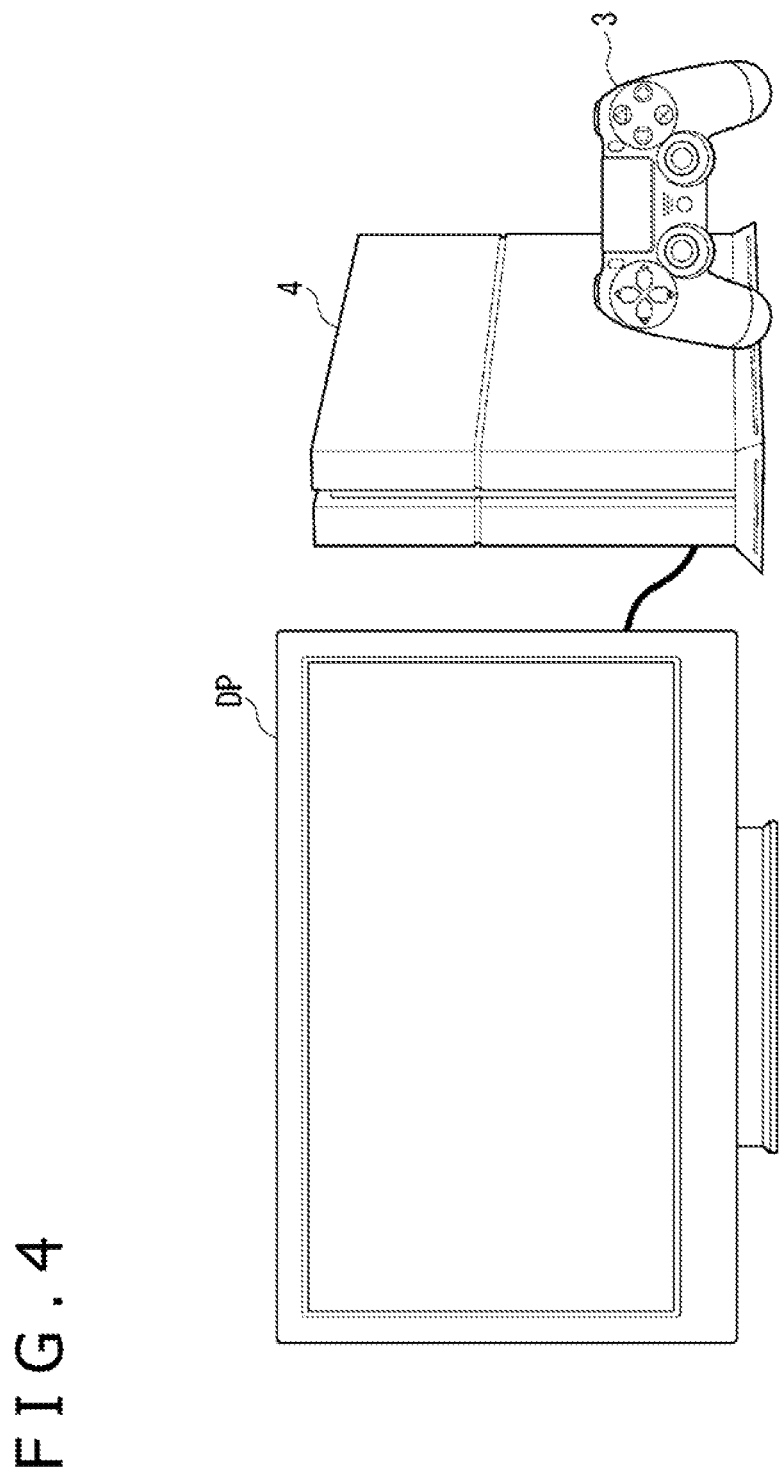
FIG. 4 is a schematic diagram depicting a first use form of the information processing system in the above-described embodiment.

FIG. 4 is a schematic diagram depicting the first use form of the information processing system 1.

The first use form is a use form in which the portable terminal 2 is not used and the information processing device 4 is independently used as depicted in FIG. 4, and is equivalent to the independent use form of the present invention. For example, the first use form is a use form in which the information processing device 4 operates as a main entity of processing of an application and at least one user (player) who operates the operation device 3 plays a game application held in the information processing device 4 or a game application held in a server (not depicted) connected via the communication unit 42.

In this first use form, when operation information to cause the above-described game application to be executed is received from the operation device 3 by the transmitting-receiving unit 41, the OS executing unit 461 of the information processing device 4 causes the application executing unit 462 to execute the corresponding game application.

Furthermore, the application executing unit 462 executes this application and causes a game based on this game application to progress in accordance with operation information according to input operation by the user (player).

[Second Use Form]

Figure 5:
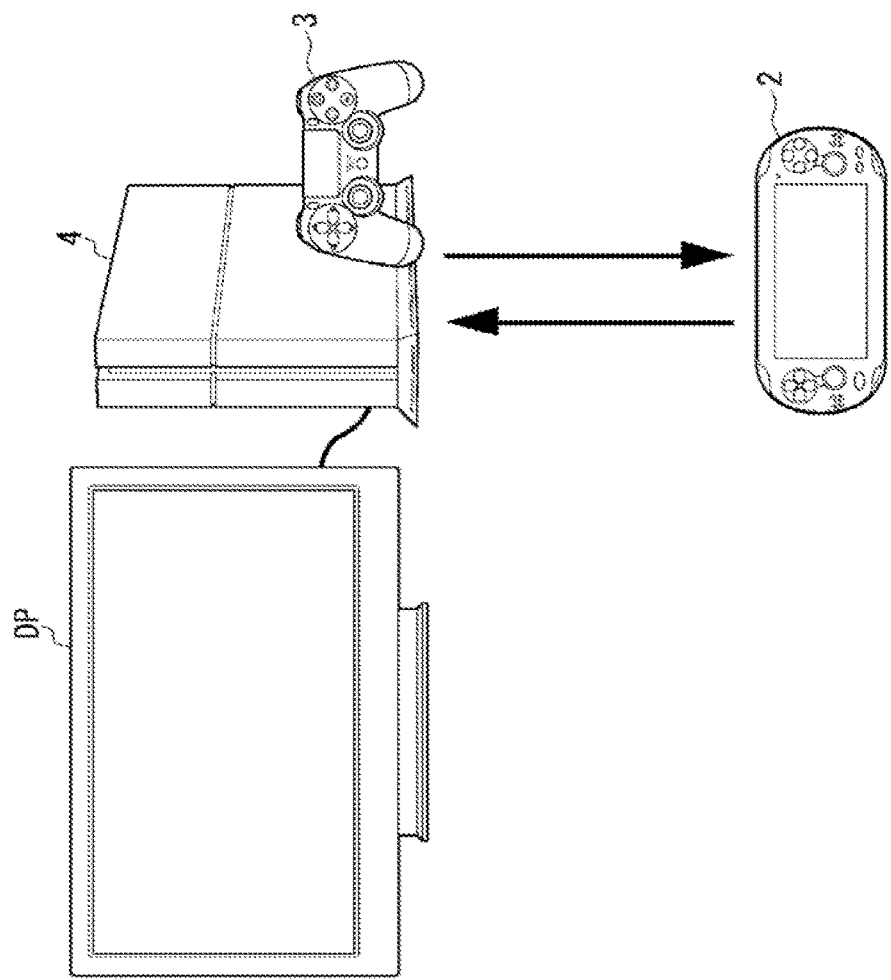
FIG. 5 is a schematic diagram depicting a second use form of the information processing system in the above-described embodiment.

FIG. 5 is a schematic diagram depicting the second use form of the information processing system 1.

The second use form is a use form in which the portable terminal 2 and the information processing device 4 are used as depicted in FIG. 5, and is equivalent to the cooperative processing form of the present invention. This second use form is a use form in which the information processing device 4 operates as a main entity of processing of an application and one user (player) uses the portable terminal 2 or the operation device 3 to play a game based on this application while viewing a game screen displayed on the portable terminal 2.

Figure 6:
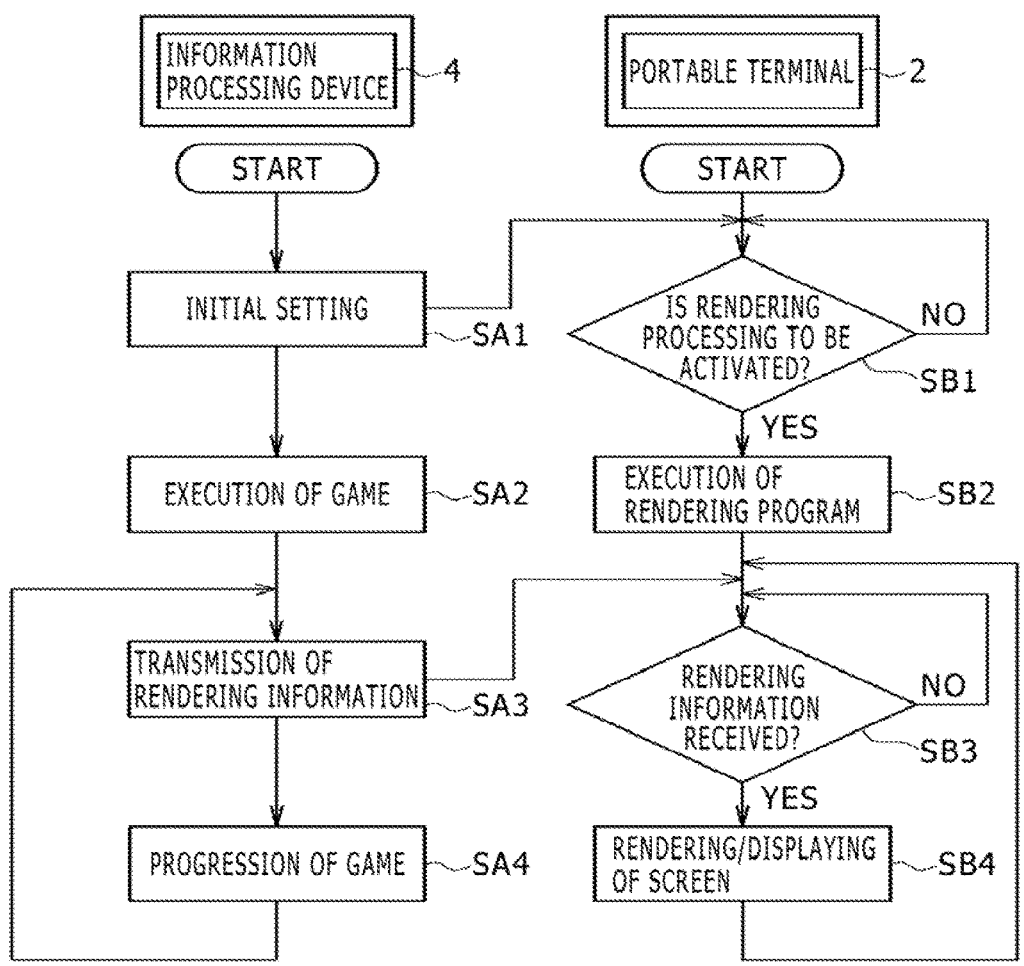
FIG. 6 is a flowchart depicting processing executed in the portable terminal and the information processing device in the second use form in the above-described embodiment.

FIG. 6 is a flowchart depicting processing of the portable terminal 2 and the information processing device 4 in the second use form.

In this second use form, the information processing device 4 executes a game application held in the storage 43 by the application executing unit 462, and the portable terminal 2 renders a game screen on the basis of rendering information received from the information processing device 4 and causes the display unit 23 to display the game screen.

Specifically, in the second use form, as depicted in FIG. 6, first the information processing device 4 executes initial setting for using the information processing device 4 in the second use form in response to setting operation by a user (step SA1). In the step SA1, in order to cause the rendering unit 26 of the portable terminal 2 to execute rendering processing, which the rendering unit 45 is caused to execute by the application executing unit 462 at the time of execution of a game, the application executing unit 462 executes setting processing of transmitting rendering information to be transmitted to the rendering unit 45 to the portable terminal 2 via the OS executing unit 461. At this time, the application executing unit 462 transmits, to the portable terminal 2 with which communications can be carried out by the communication unit 42, control information indicating use of the portable terminal 2 in the second use form, i.e. control information to cause the portable terminal 2 to execute the rendering processing on the basis of the rendering information received from the information processing device 4.

Next, the OS executing unit 461 causes the application executing unit 462 to execute a game application selected by the user (step SA2).

Thereafter, the information processing device 4 makes transition of the processing to a step SA3.

The OS executing unit 271 of the portable terminal 2 determines whether or not the above-described control information has been received from the information processing device 4 with which communications can be carried out by the communication unit 22 (step SB1). If it is determined here that the above-described control information has not been received, the OS executing unit 271 returns the processing to the step SB1.

On the other hand, if it is determined that the above-described control information has been received, the application executing unit 272 executes a rendering program stored in the storing unit 25 under control by the OS executing unit 271 (step SB2). This enables the portable terminal 2 to be used in the second use form. Thereafter, the portable terminal 2 makes transition of the processing to a step SB3.

In the step SA3, according to the progression of the game based on the game application executed by the application executing unit 462, the application executing unit 462 transmits the rendering information to be output to the rendering unit 45 in the normal case to the portable terminal 2 via the OS executing unit 461 and the communication unit 42 (step SA3). As such rendering information, image data of objects (including characters) included in a game screen, placement (coordinates) of these objects, information indicating the point of view of the player set in a virtual space, and so forth are included. That is, this rendering information is the information necessary for the rendering unit 45 to render a screen of the game (game screen) based on the game application in execution and is also the information necessary for the rendering unit 26 to render this game screen.

In the above-described step SA3, sound information relating to sounds to be output by the portable terminal 2 is also output according to need.

Furthermore, the application executing unit 462 continuously executes the game application to cause the game to progress (step SA4).

These steps SA3 and SA4 are repeatedly carried out until the end of the game application in execution is selected by the player. If the end of this game application is selected, the transmission processing of the rendering information via the OS executing unit 461 by the application executing unit 462 is ended. Besides, control information to end the rendering processing is transmitted to the portable terminal 2.

In the step SB3, the OS executing unit 271 of the portable terminal 2 determines whether or not the above-described rendering information has been received from the information processing device 4 via the communication unit 22 (step SB3).

If it is determined that the rendering information has not been received in the determination processing of the step SB3, the OS executing unit 271 returns the processing to the step SB3.

On the other hand, if it is determined that the rendering information has been received in the determination processing of the step SB3, under control by the OS executing unit 271, the application executing unit 272 outputs the received rendering information to the rendering unit 26 and causes the rendering unit 26 to render an image based on this rendering information, i.e. a game screen. Thereby, the game screen is displayed on the display unit 23 (step SB4). If the above-described sound information is received from the information processing device 4, the portable terminal 2 also outputs sounds according to this sound information.

These steps SB3 and SB4 are repeatedly carried out until the above-described control information to end the rendering processing is received from the information processing device 4.

Furthermore, in such a second use form, the application executing unit 462 causes the game to progress according to operation information received from the portable terminal 2 or the operation device 3.

Here, in the information processing device 4, the rendering unit 26 does not execute the rendering processing of the game screen, and only renders an image of one frame indicating that the information processing device 4 is being used in the second use form for example. Therefore, the processing load of the rendering unit 45 configured to include a GPU is small compared with the case of rendering the game screen. Meanwhile, although the GPU is generally an arithmetic device specializing in image processing, the arithmetic processing capability of the GPU (for example processing capability of floating-point arithmetic) is higher than the arithmetic processing capability of the CPU in some cases. On the other hand, depending on the game, the capability required for the GPU regarding rendering of the game screen is not high in some cases. In such a case, the rendering unit 45 having a high-performance GPU often becomes a somewhat surplus resource.

For such a reason, the above-described application executing unit 462 causes the GPU possessed by the rendering unit 45 to execute part of the processing in the game application in execution. As such processing the GPU is caused to execute, soft real-time processing (processing that does not have a very serious influence on execution of the application even if the processing is not immediately completed) and processing that periodically occurs are cited for example. More specifically, as this processing, a long-term artificial intelligence (AI) routine in the executed application is cited. In more detail, as this processing, a thinking routine, movement route change such as reconfiguration of a navigation map, execution of AI simulation outside a map, and so forth are cited. Besides, recognition processing of image and sound and synthesis processing of image and sound are cited.

By causing the GPU to execute such processing, rapid arithmetic processing can be carried out and the progression of the game can be made more smoothly. Besides, the resources of the information processing device 4 can be effectively utilized. In addition, the processing load of the information processing device 4 can be reduced by causing the rendering unit 26 of the portable terminal 2 to execute the rendering processing. It is explained that, in the present use form, the game screen rendered by the rendering unit 26 of the portable terminal 2 is displayed on the display unit 23. However, the configuration is not limited thereto. The portable terminal 2 may transmit image information of this game screen to the information processing device 4 and the information processing device 4 may cause the display device DP to display the game screen on the basis of the received image information.

Furthermore, image data of objects and so forth configuring the game screen may be held in the storing unit 25 of the portable terminal 2 in advance. In this case, the information processing device 4 transmits, to the portable terminal 2, information changed according to the progression of the game, such as placement (coordinates) of these objects and information indicating the point of view of the player set in a virtual space, as rendering information. In addition, the rendering unit 26 of the portable terminal 2 may render a game screen according to the received rendering information and cause the display unit 23 to display this game screen.

Moreover, plural terminals may exist as the portable terminals 2 that receive the above-described rendering information from the information processing device 4 and render an image according to this rendering information. For example, the information processing device 4 may transmit the same rendering information to the plural portable terminals 2 and cause each portable terminal 2 to render and display the same execution screen (game screen). Alternatively, the information processing device 4 may transmit pieces of rendering information different from each other to the plural portable terminals 2 and cause the respective portable terminals 2 to render and display execution screens (game screens) different from each other. Also in this case, each portable terminal 2 may transmit image information according to the rendered image to the information processing device 4.

In addition, plural devices may exist as the information processing devices 4 that operate in cooperation with the portable terminal 2. In this case, each of the plural information processing devices 4 may be capable of operating in cooperation with the portable terminal 2. Alternatively, a configuration may be employed in which at least one of these plural information processing devices 4 communicates with the portable terminal 2 and communicates with the other information processing devices 4 and these information processing devices 4 and the portable terminal 2 operate in cooperation. In these cases, furthermore, plural terminals may exist as the portable terminals 2 that operate in cooperation with the plural information processing devices 4. As an example in which plural information processing devices 4 and plural portable terminals 2 exist, a configuration is cited in which plural sets each including at least one information processing device 4 and at least one portable terminal 2 that operate in cooperation with each other exist and these plural sets execute predetermined processing with communications and cooperation with each other.

[Third Use Form]

Figure 7:
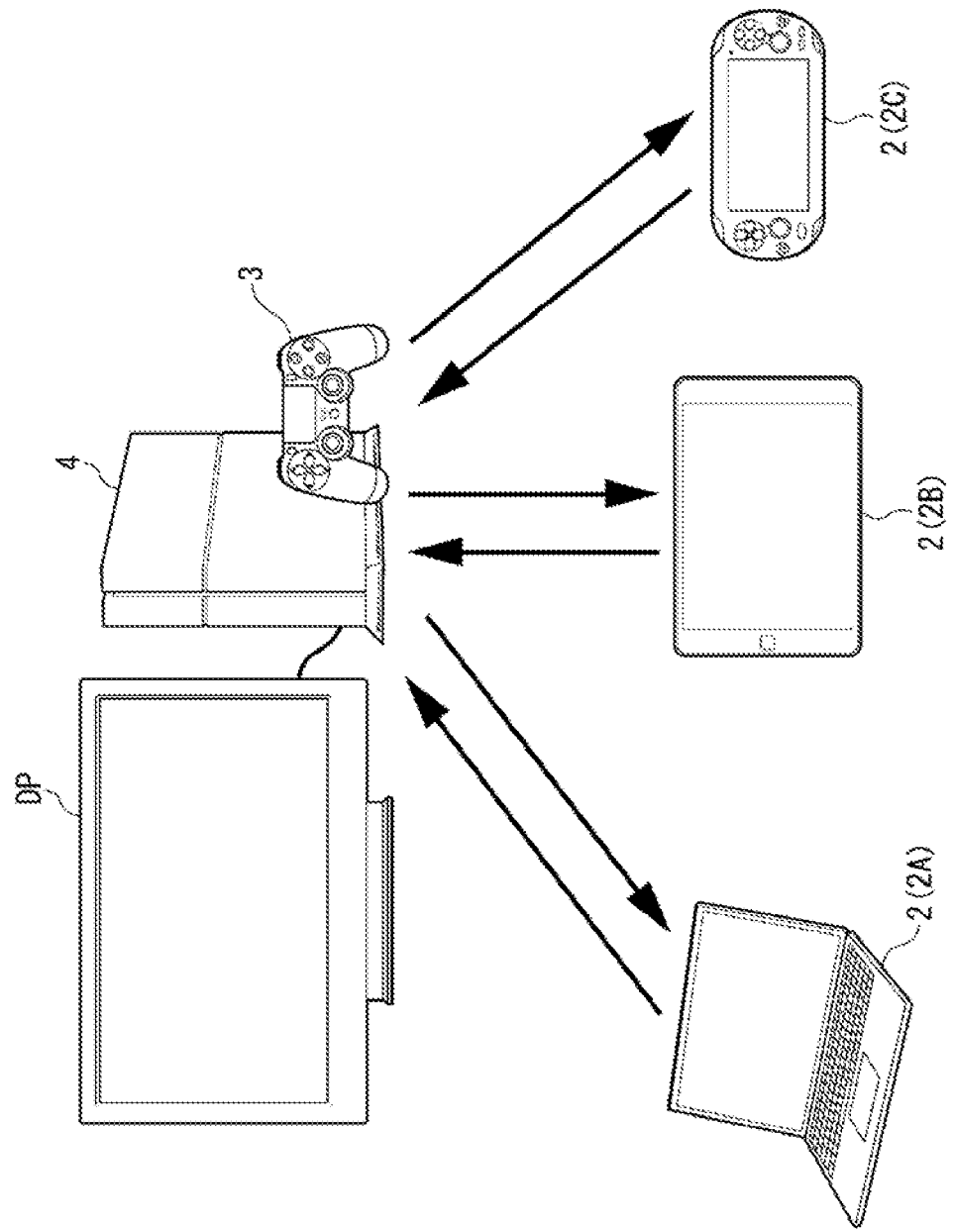
FIG. 7 is a schematic diagram depicting a third use form of the information processing system in the above-described embodiment.

FIG. 7 is a schematic diagram depicting the third use form of the information processing system 1.

The third use form is a use form in which at least one portable terminal 2 and the information processing device 4 are used as depicted in FIG. 7, and is equivalent to the game provision form of the present invention. This third use form is a use form in which the information processing device 4 operates as a main entity of processing of an application and at least one user (player) uses the portable terminal 2 to play a game based on this application while viewing a game screen displayed on the portable terminal 2.

Figure 8:
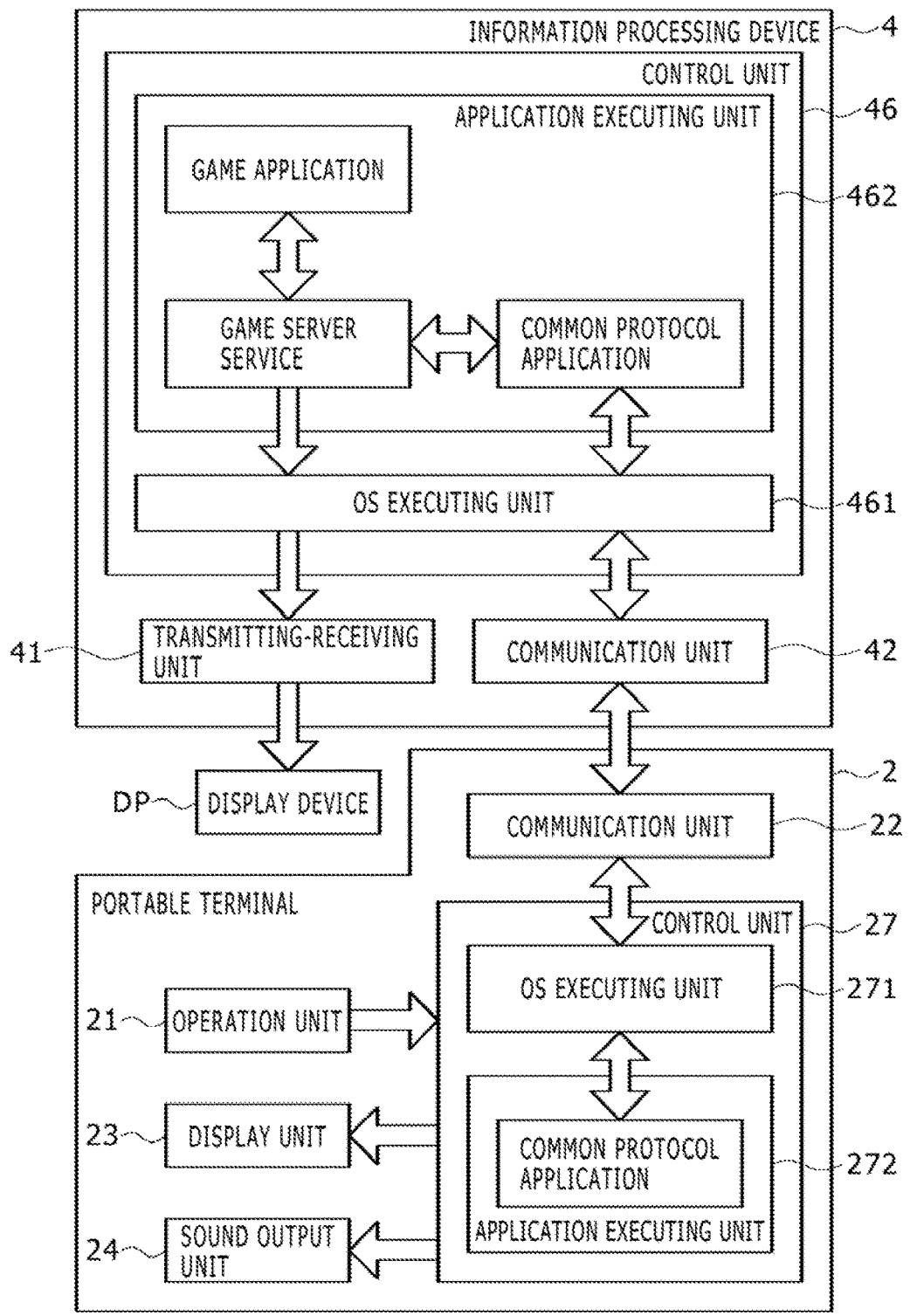
FIG. 8 is a conceptual diagram depicting input and output of information in the information processing device in the third use form in the above-described embodiment.

FIG. 8 is a conceptual diagram depicting input and output of information in the information processing device 4 in the third use form.

In such a third use form, as depicted in FIG. 8, each portable terminal 2 and the information processing device 4 execute a common protocol application held in each of them by the application executing units 272 and 462. This common protocol application is a communication application to transmit and receive information between the portable terminal 2 and the information processing device 4 based on a predefined common protocol, and is not a game application.

Furthermore, the application executing unit 462 of the information processing device 4 executes a program called a game server service and a game application besides the above-described common protocol application.

The game server service is a program to distribute and transmit processing results among processing results of the executed game application to the connected portable terminal 2, display device DP, and so forth.

In such a third use form, the application executing unit 462 of the information processing device 4 executes a game application according to operation information received from the portable terminal 2 or the operation device 3 and generates processing results in which image information of an execution screen or the like (including image information generated by the rendering unit 45) and sound information are included. Then, by the game server service being executed, the application executing unit 462 outputs, to the OS executing unit 461, the processing result that should be transmitted to the display device DP among these processing results and pass the common protocol application the processing result that should be transmitted to the portable terminal 2, to thereby distribute these processing results.

The processing result that should be transmitted to the display device DP is transmitted to the display device DP via the transmitting-receiving unit 41 by the OS executing unit 461. Thereby, the execution screen of the OS or game application is displayed. Besides, sounds are output.

The processing result that should be transmitted to the portable terminal 2 is subjected to processing such as protocol conversion by the above-described common protocol application and then is output from the application executing unit 462 to the OS executing unit 461. Then, this processing result is transmitted to the portable terminal 2 via the communication unit 42 by the OS executing unit 461.

In the portable terminal 2, the communication unit 22 receives the above-described processing result and outputs the processing result to the OS executing unit 271, and the OS executing unit 271 outputs the acquired processing result to the application executing unit 272. The application executing unit 272 executes the common protocol application and processes the image information, the sound information, and a program included in the acquired processing result by this common protocol application.

Of them, the image information is processed by the rendering unit 26 and is output to the display unit 23 and thereby an image (execution screen or the like) according to this image information is displayed. Furthermore, the sound information is processed by the OS executing unit 271 and is output to the sound output unit 24 and thereby sounds (sound effect, background music (BGM), and so forth) according to this sound information are output.

Moreover, the program is temporarily held in the storing unit 25 and is executed by the application executing unit 272.

Furthermore, in the portable terminal 2, when an operation signal according to input operation by a user (player) is input from the operation unit 21, the OS executing unit 271 of the control unit 27 outputs this operation signal to the application executing unit 272. For example, when an operation signal to cause the information processing device 4 to execute the above-described game application or an operation signal according to input operation to an execution screen acquired from the above-described information processing device 4 is input from the operation unit 21, the OS executing unit 271 outputs this operation signal to the application executing unit 272.

The application executing unit 272 generates operation information according to the input operation signal on the basis of the above-described common protocol by the common protocol application in execution, and outputs this operation information to the OS executing unit 271. Then, the OS executing unit 271 transmits the input operation information to the information processing device 4 via the communication unit 22.

Meanwhile, in the information processing device 4, when the operation information is received from the above-described portable terminal 2 by the communication unit 42 and this operation information is output to the OS executing unit 461, the OS executing unit 461 outputs this operation information to the application executing unit 462.

The application executing unit 462 processes the acquired operation information by the common protocol application in execution and outputs the processed operation information to the game application in execution via the game server service. Then, the application executing unit 462 causes the game to progress on the basis of this operation information in the game application in execution and executes processing such as updating of the execution screen. Then, the information processing device 4 executes the above-described processing of transmitting the processing result to the portable terminal 2 again.

As above, in the third use form, the operation information according to input operation by the user made by using the portable terminal 2 is transmitted to the information processing device 4 and the information processing device 4 transmits the processing result according to the received operation information to the portable terminal 2. Such processing by the portable terminal 2 and the information processing device 4 is repeatedly executed and thereby the game based on the game application is caused to progress.

The information processing device 4 may execute an application as a different task for each portable terminal 2 or may execute an application as one task so that the application may be shared by plural portable terminals 2.

Specifically, if the application executing unit 462 of the information processing device 4 executes a game application that can be caused to progress by one user, the application executing unit 462 may execute the game application in such a manner that the game can be caused to progress individually in each portable terminal 2 connected to the information processing device 4. As such a game, a game that can be played individually by each user like a puzzle game can be exemplified.

Furthermore, if the application executing unit 462 of the information processing device 4 executes a game application in which plural users each having the portable terminal 2 can participate to cause a game to progress, the application executing unit 462 may execute the game application in such a manner that the game is caused to progress according to operation information received from each portable terminal 2 and the progression state of this game is shared by the respective portable terminals 2. As such a game, a game can be exemplified that is so configured that plural characters are disposed in one virtual space and the corresponding character can be controlled by each portable terminal 2.

[Fourth Use Form]

The fourth use form is a use form in which the portable terminal 2 and the information processing device 4 are used as with the above-described second use form, and is equivalent to the task processing form of the present invention. Specifically, the fourth use form is a use form in which the portable terminal 2 operates as a main entity of processing of a game application and a user (player) operates the portable terminal 2 to play a game based on this game application. In this case, the information processing device 4 plays a role in reducing the processing load of the portable terminal 2 by processing a partial task specified by the portable terminal 2 among the tasks of this game.

Figure 9:
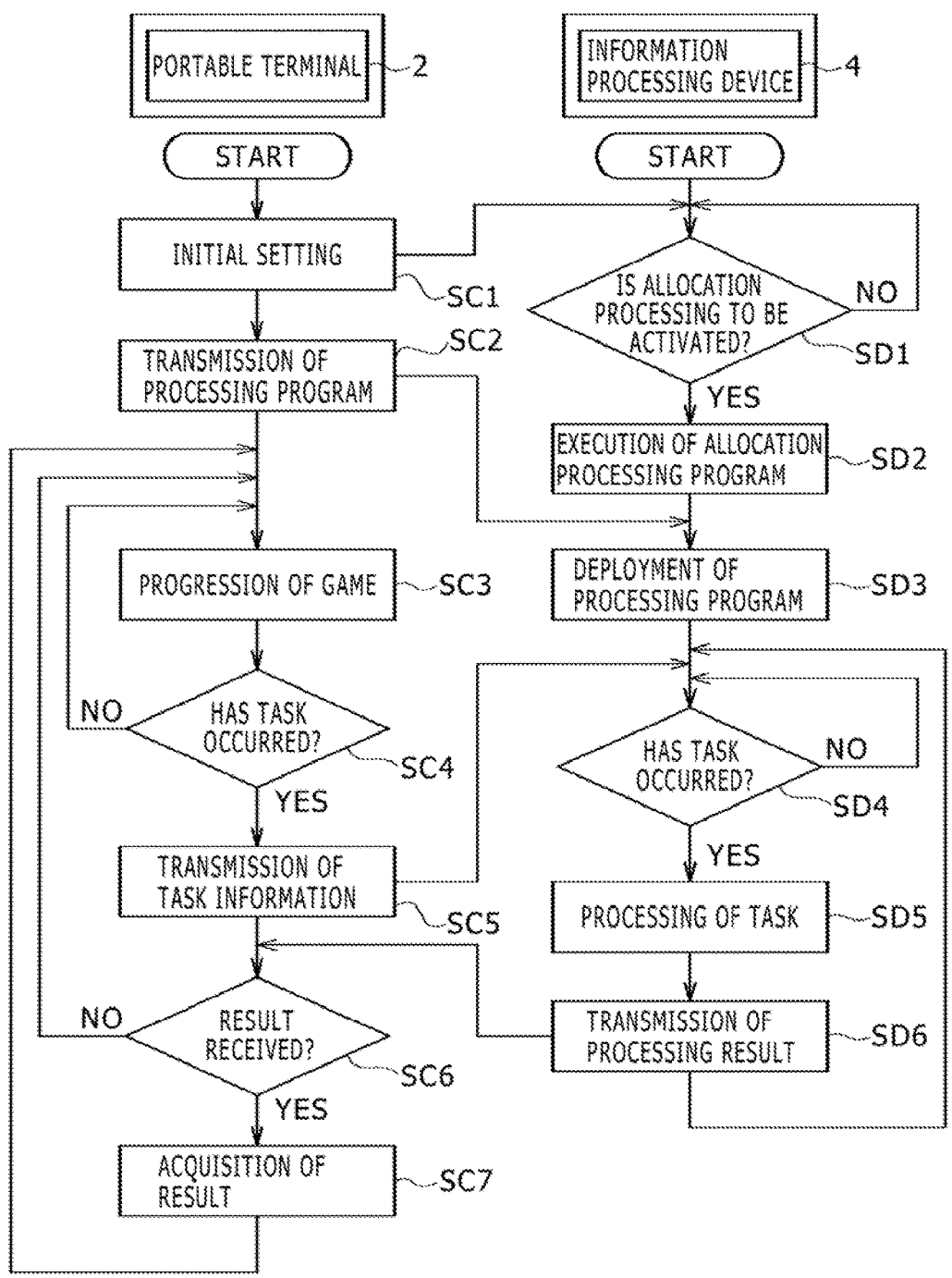
FIG. 9 is a flowchart depicting processing executed in the portable terminal and the information processing device in a fourth use form in the above-described embodiment.

FIG. 9 is a flowchart depicting processing of the portable terminal 2 and the information processing device 4 in the fourth use form.

In this fourth use form, if the portable terminal 2 causes the information processing device 4 to execute a partial task (processing) of a game, as depicted in FIG. 9, first the application executing unit 272 of the portable terminal 2 executes the corresponding game application and executes a task selection application held in the storing unit 25. Then, the application executing unit 272 executes, by the task selection application, initial setting processing such as setting of the task to be executed by the information processing device 4 among the tasks of the game based on the executed game application, and transmits the contents of setting in this initial setting processing to the information processing device 4 (step SC1). The contents of setting are transmitted via the communication unit 22 by the OS executing unit 271.

In the information processing device 4, the OS executing unit 461 determines whether or not the above-described contents of setting have been received from the portable terminal 2 (step SD1). If determining that the contents of setting have been received, the OS executing unit 461 causes the application executing unit 462 to execute an allocation processing application stored in the storage 43 to activate an allocation processing function (step SD2). If it is determined that the contents of setting have not been received, the determination processing of the step SD1 is repeatedly executed.

The portable terminal 2 that has transmitted the contents of setting in the above-described step SC1 transmits a processing program to process the set task to the information processing device 4 (step SC2), and causes the game to progress on the basis of the game application in execution (step SC3).

Furthermore, in the information processing device 4 that has received the processing program from the portable terminal 2, the application executing unit 462 that executes the allocation processing application deploys this processing program in the storing unit 44 to make this processing program usable (step SD3). Thereafter, the information processing device 4 makes transition of the processing to a step SD4.

After the step SC3, the application executing unit 272 determines whether or not a task to be processed by the information processing device 4 has occurred in the game in execution (step SC4). As such a task, a task that can be processed as soft real-time processing and a task that periodically occurs can be exemplified. Specifically, as the relevant task, a task of carrying out rebalancing of a scene graph made by organizing all objects disposed in a virtual space into a tree structure and image recognition processing and sound recognition processing can be exemplified.

Here, if it is determined that the relevant task has not occurred, the application executing unit 272 returns the processing to the step SC3 to continuously cause the game to progress.

On the other hand, if it is determined that the task to be processed by the information processing device 4 has occurred in the determination processing of the step SC4, the application executing unit 272 transmits task information that is information relating to this task to the information processing device 4 to cause this task to be processed (step SC5). For example, if this task is the above-described rebalancing of a scene graph, scene graph data, the data necessary for this rebalancing of the scene graph, and instruction information indicating execution of the rebalancing are included in such task information.

Thereafter, the portable terminal 2 makes transition of the processing to a step SC6.

In the step SD4, the application executing unit 462 that has executed the allocation processing application determines whether or not the above-described task has occurred (whether or not the task information has been received) (step SD4), and repeatedly executes the determination processing of the step SD4 until the task occurs.

On the other hand, if determining that the above-described task has occurred in the determination processing, the application executing unit 462 processes the task according to the task information by using the processing program deployed in the storing unit 44 (step SD5).

Then, the application executing unit 462 transmits the processing result of the task (for example, rebalanced scene graph) to the portable terminal 2 (step SD6). Thereafter, the application executing unit 462 returns the processing to the step SD4 to prepare for reception of further task information.

In the step SC6, the application executing unit 272 determines whether or not the processing result has been received from the information processing device 4 (step SC6).

If determining that the processing result has not been received in the determination processing of the step SC6, the application executing unit 272 returns the processing to the step SC3 to continuously cause the game to progress.

On the other hand, if determining that the processing result has been received in the determination processing of the step SC6, the application executing unit 272 acquires this processing result (step SC7) and returns the processing to the step SC3. Due to this, the game is caused to progress on the basis of this processing result.

Then, when the game application in execution is ended in the portable terminal 2, end information is transmitted by the application executing unit 272 (via the OS executing unit 271 and the communication unit 22). When the information processing device 4 receives this end information and the application executing unit 462 acquires the end information, the application executing unit 462 ends the above-described allocation processing application. Furthermore, if the communications between the portable terminal 2 and the information processing device 4 stop for a predetermined time, the application executing unit 272 processes, by itself, the task caused to be processed in the information processing device 4 thus far, and the application executing unit 462 ends the above-described allocation processing application.

In the above description, rebalancing of a scene graph in a game application executed in the portable terminal 2 and image recognition and sound recognition are exemplified as the task the information processing device 4 is caused to process. However, the task is not limited thereto and may be another task.

For example, as such a task, a long-term artificial intelligence (AI) routine in an executed application is cited. Specifically, as this processing, a thinking routine, movement route change such as reconfiguration of a navigation map, execution of AI simulation outside a map, and so forth are cited. Besides, sound synthesis processing is cited as the task.

Furthermore, if the above-described task is rebalancing of a scene graph, regeneration of an area for portal/anti-portal, addition/removal of an object, and reconfiguration of the collision model are cited as the task.

That is, as the above-described task, a task that imposes no hindrance on the application executed by the application executing unit 272 even when a certain amount of time is taken from transmission of task information to reception of a processing result is cited. For example, if the frame rate that is rendered by the rendering unit 26 and is displayed on the display unit 23 is at least 30 frames/second and at most 120 frames/second, it is preferable for this task to be a task whose period from transmission of task information to reception of a processing result is from several frames to several tens of frames. Such a task can allow a game to progress without causing a user (player) to be aware of that the task is being executed by the information processing device 4.

Furthermore, as the above-described task, a task for which high arithmetic processing performance is required is cited and furthermore a task whose occurrence cycle is a comparatively-long cycle is cited. By processing such a task by the information processing device 4 having high processing performance compared with the portable terminal 2, the processing load of the portable terminal 2 can be reduced. Besides, the power consumption of the portable terminal 2 can be reduced, which can extend the battery life.

Moreover, if the information processing device 4 can process a task according to task information transmitted by the portable terminal 2 by executing a function and a program preliminarily possessed by the information processing device 4, the portable terminal 2 does not have to transmit a processing program to the information processing device 4. For example, if the information processing device 4 holds a sound recognition program, the portable terminal 2 does not have to transmit this sound recognition program to the information processing device 4.

In this case, the task selection application of the portable terminal 2 determines whether or not the above-described task can be processed without transmitting a processing program (whether or not this task can be processed by a function and a program possessed by the information processing device 4). If it is determined that the task can be processed, setting information to specify a processing program to be used is transmitted instead of transmitting a processing program. Then, the application executing unit 462 of the information processing device 4 deploys the processing program specified by this setting information in the storing unit 44 and processes a task according to acquired task information by using this processing program. In such a case, the amount of communications between the portable terminal 2 and the information processing device 4 can be reduced. Besides, a game can be immediately played in the portable terminal 2.

Similarly to the above-described second use form, the GPU possessed by the rendering unit 45 may be caused to execute processing of at least part of the above-described task processed by the information processing device 4.

Furthermore, the information processing device 4 may individually execute the above-described processing between the information processing device 4 and plural portable terminals 2 if the information processing device 4 has sufficient processing performance and processing capability. That is, when the information processing system 1 is used in the fourth use form, the portable terminal 2 that causes the information processing device 4 to execute a partial task is not limited to one terminal and may be plural terminals. Therefore, the information processing device 4 may execute the same processing specified by the plural portable terminals 2 connected by communications or may execute kinds of processing different for each of these portable terminals 2.

[Effects of Embodiment]

According to the information processing system 1 in accordance with the present embodiment described above, the following effects exist.

In the above-described first use form (independent use form), the information processing device 4 independently executes a game application and causes a game to progress according to operation information received from the connected operation device 3. This can cause the game to progress by using the operation device 3 even when the information processing device 4 does not exist in an environment in which communications with the portable terminal 2 are possible.

The above-described second use form (cooperative processing form) is similar to the above-described first use form in that the application executing unit 462 executes a game application. However, in the second use form, the application executing unit 462 transmits rendering information, which is output to the rendering unit 45 via the OS executing unit 461 to cause the rendering unit 45 to render a game screen, to the portable terminal 2 and causes the game screen based on this rendering information to be displayed on the display unit 23 of the portable terminal 2 to cause a game to progress. This can reduce the processing load of the rendering unit 45 and hence the information processing device 4. Besides, the game can be caused to progress, with the game screen displayed by the portable terminal 2.

In the above-described third use form (game provision form), the information processing device 4 receives operation information from at least one portable terminal 2 and executes a game application according to this operation information to cause a game to progress. Furthermore, the information processing device 4 transmits a processing result including an execution screen to the portable terminal 2. According to this, without introducing the game application into each portable terminal 2 connected to the information processing device 4, a game based on the game application held in the information processing device 4 can be played by using the portable terminal 2.

In the above-described fourth use form (task processing form), the information processing device 4 processes a partial task of a game application executed in the portable terminal 2 and transmits the processing result of this partial task to the portable terminal 2. This allows the information processing device 4 to be used as an arithmetic processing device externally associated with the portable terminal 2 and thus can reduce the processing load in the portable terminal 2. Thus, for example, executing processing involving a high load by the information processing device 4 can reduce the processing load in the portable terminal 2. Therefore, even an application for which comparatively-high processing performance is required can be executed by the portable terminal 2. Besides, the power consumption of the portable terminal 2 can be reduced, which allows the portable terminal 2 to be used for a long time.

Furthermore, the application executing unit 462 serving also as a switching unit executes switching processing of switching the operating state of the information processing device 4 to any of these first to fourth use forms. This can switch the operating state of the information processing device 4 to the use form suitable for the use environment of the information processing system 1. Therefore, the general versatility of the information processing device 4 and hence the information processing system 1 can be enhanced.

In the above-described fourth use form, the above-described partial task processed by the information processing device 4 is at least any of soft real-time processing and processing that periodically occurs. According to this, if this partial task is the soft real-time processing, a game can be surely caused to progress in the portable terminal 2 even when the portable terminal 2 cannot immediately acquire a processing result in the information processing device 4. On the other hand, if the partial task is the processing that periodically occurs, the information processing device 4 can wait for the processing of the partial task according to the corresponding cycle. Thus, the information processing device 4 can rapidly transmit a processing result to the portable terminal 2 and a game can be surely caused to progress in the portable terminal 2.

In the above-described fourth use form, by processing, by the GPU possessed by the rendering unit 45, arithmetic processing included in the partial task processed by the information processing device 4, the arithmetic processing result can be rapidly obtained compared with the case in which the CPU configuring the control unit 46 executes this arithmetic processing. This can transmit the processing result of this partial task to the portable terminal 2 in a comparatively-short time. Therefore, it is possible to shorten the time from issuance of the above-described partial task from the portable terminal 2 to the information processing device 4 to the transmission of the processing result to the portable terminal 2.

In the above-described fourth use form, the information processing device 4 acquires a processing program from the portable terminal 2 and processes a task indicated by task information received from the portable terminal 2 by using this processing program. This can surely process this task even when the information processing device 4 does not hold this processing program. Furthermore, this can extend the width of the task that can be processed in the information processing device 4.

Meanwhile, the information processing device 4 is configured to be capable of independently executing a game application as depicted as the above-described first use form, and thus preliminarily holds a processing program to execute predetermined processing. Therefore, in the fourth use form, if the information processing device 4 preliminarily holds the processing program to process the task, the information processing device 4 processes the above-described partial task by using this processing program without receiving the processing program from the portable terminal 2. According to this, there is no need to receive this processing program from the portable terminal 2. Therefore, the amount of communications between the portable terminal 2 and the information processing device 4 can be reduced. Besides, a game can be immediately played in the portable terminal 2.

In the above-described second use form, the application executing unit 462 of the information processing device 4 causes the GPU possessed by the rendering unit 45 to execute partial arithmetic processing in processing based on an executed game application. Here, when the information processing device 4 is used in the second use form, the GPU of the rendering unit 45 does not carry out rendering of the game screen and thus the processing load thereof is comparatively low. Meanwhile, the GPU has high arithmetic processing performance as described above. Therefore, the result of this partial arithmetic processing can be rapidly acquired and the game can be caused to progress without delay. Besides, the resources of the information processing device 4 can be effectively utilized.

In the above-described second use form, the processing in which the above-described partial arithmetic processing is included is at least any of soft real-time processing and processing that periodically occurs. According to this, if this processing is the soft real-time processing, the game based on the game application in execution can be surely caused to progress even when the application executing unit 462 cannot immediately acquire a processing result by the GPU. On the other hand, if the processing is the processing that periodically occurs, the GPU can be caused to periodically execute the above-described arithmetic processing and thus the GPU, whose processing load is comparatively small, can be effectively utilized.

[Modifications of Embodiment]

The present invention is not limited to the above-described embodiment and modifications, improvements, and so forth in such a range that the object of the present invention can be achieved are included in the present invention.

In the above-described embodiment, the information processing system 1 in which three portable terminals 2 in total, i.e. the notebook PC 2A, the smartphone 2B, and the portable game machine 2C, are connected by communications to one information processing device 4 is exemplified. However, the present invention is not limited thereto. Specifically, the number of portable terminals 2 that communicate with the information processing device 4 may be equal to or smaller than 2 or may be equal to or larger than 4. Furthermore, the portable terminals 2 that communicate with the information processing device 4 may be the same kind of portable terminals and can be selected as appropriate.

It is explained that, in the above-described embodiment, the information processing device 4 as the game device of the present invention is configured by a stationary-type game device, a PC, etc. However, the present invention is not limited thereto. Specifically, the game device of the present invention may be configured by a portable terminal if it has sufficient processing performance. It is explained that, in the above-described embodiment, the portable terminal 2 and the information processing device 4 execute a game application. However, the present invention is not limited thereto. Specifically, the portable terminal 2 and the information processing device 4 may be configured as what executes another application such as a presentation application.

It is explained that, in the above-described embodiment, each portable terminal 2 and the information processing device 4 communicate based on a common protocol in the above-described third use form. However, the present invention is not limited thereto. Specifically, if the information processing device 4 can execute processing according to operation information received from the portable terminal 2 and transmission of a processing result to the portable terminal 2 without a problem, a certain portable terminal 2 and another portable terminal 2 may communicate with the information processing device based on different protocols.

It is explained that, in the above-described embodiment, the information processing device 4 transmits a processing result including an execution screen of a game to the portable terminal 2 in the above-described third use form. However, the present invention is not limited thereto. Specifically, the execution screen does not necessarily need to be included in the processing result transmitted by the information processing device 4. For example, in the case in which the information processing device 4 executes an application executed by voice of a user, the portable terminal 2 may transmit sound information to the information processing device 4 and the information processing device 4 may transmit sound information as a processing result to the portable terminal 2.

It is explained that, in the above-described embodiment, the control program to cause the application executing unit 462 to execute the switching processing of switching the operating state of the information processing device 4 to any of the above-described first to fourth use forms is held in the storage 43. However, the present invention is not limited thereto. For example, the control program may be acquired from a server or the like via a network N when these kinds of processing are executed, or may be recorded in another format in a disk-type recording medium or the like. This applies also to the control program to cause the application executing unit 272 to execute the above-described switching processing. Furthermore, it is explained that, in the above-described embodiment, the application executing unit 462 executes the above-described switching processing. However, the present invention is not limited thereto. For example, the OS executing unit 461 may execute this switching processing. This is the same also in the portable terminal 2.

INDUSTRIAL APPLICABILITY

The present invention can be applied to an information processing device that can communicate with a portable terminal and, for example, can be favorably applied to a game device configured to be capable of executing a game application.

REFERENCE SIGNS LIST

1 . . . Information processing system (game system), 2 . . . Portable terminal, 2A . . . Notebook PC (portable terminal), 2B . . . Smartphone (portable terminal), 2C . . . Portable game machine (portable terminal), 3 . . . Operation device, 4 . . . Information processing device (game device), 42 . . . Communication unit, 45 . . . Rendering unit, 462 . . . Application executing unit (executing unit, switching unit).

The invention claimed is:

1. A game device comprising:
a communication unit communicable with a portable terminal;
an executing unit that executes a game application;
a rendering unit that renders a game screen of a game based on the game application; and
a switching unit that switches an operating state,
wherein the game device is configured to be usable in
an independent use form in which the executing unit executes the game application and the rendering unit renders the game screen to cause the game to progress, and
other use forms in which processing relating to a game executed by using the portable terminal is executed,
the switching unit carries out switching to any of the independent use form and the other use forms to cause the game device to operate,
the rendering unit has a graphics processing unit capable of executing rendering processing of rendering the game screen and a different kind of processing from the rendering processing, and
kind of processing executed by the graphics processing unit is different between a case in which the game device is used in the independent use form and cases in which the game device is used in the other use forms,
wherein the other use forms include a task processing form in which the executing unit processes a partial task of a game application executed in the portable terminal and transmits a processing result of the partial task to the portable terminal,
wherein the executing unit causes the graphics processing unit to execute at least the rendering processing if the game device is used in the independent use form,
wherein the executing unit causes the graphics processing unit to execute at least arithmetic processing included in the partial task if the game device is used in the task processing form, and
wherein the executing unit processes the partial task by using a processing program acquired from the portable terminal.

2. The game device according to claim 1,
wherein the partial task is at least any of soft real-time processing and processing that periodically occurs.

3. The game device according to claim 1,
wherein the other use forms include a cooperative processing form in which the executing unit executes the game application and transmits rendering information to the portable terminal to cause the portable terminal to render the game screen and cause the game to progress,
the executing unit causes the graphics processing unit to execute at least the rendering processing if the game device is used in the independent use form, and
the executing unit causes the graphics processing unit to execute partial arithmetic processing in processing based on the game application if the game device is used in the cooperative processing form.

4. The game device according to claim 3,
wherein the processing in which the partial arithmetic processing is included is at least any of soft real-time processing and processing that periodically occurs.

5. A game system comprising:
a game device including
a communication unit communicable with a portable terminal,
an executing unit that executes a game application,
a rendering unit that renders a game screen of a game based on the game application, and
a switching unit that switches an operating state,
the game device being configured to be usable in
an independent use form in which the executing unit executes the game application and the rendering unit renders the game screen to cause the game to progress, and
other use forms in which processing relating to a game executed by using the portable terminal is executed,
the switching unit carrying out switching to any of the independent use form and the other use forms to cause the game device to operate,
the rendering unit having a graphics processing unit capable of executing rendering processing of rendering the game screen and a different kind of processing from the rendering processing,
kind of processing executed by the graphics processing unit being different between a case in which the game device is used in the independent use form and cases in which the game device is used in the other use forms; and
the portable terminal;
wherein the other use forms include a task processing form in which the executing unit processes a partial task of a game application executed in the portable terminal and transmits a processing result of the partial task to the portable terminal, wherein the executing unit causes the graphics processing unit to execute at least the rendering processing if the game device is used in the independent use form, wherein the executing unit causes the graphics processing unit to execute at least arithmetic processing included in the partial task if the game device is used in the task processing form, and wherein the executing unit processes the partial task by using a processing program acquired from the portable terminal.

6. A control method of a game device having an executing unit that executes a game application and a graphics processing unit capable of rendering a game screen of a game based on the game application, the control method comprising:

switching an operating state of the game device among an independent use form in which the executing unit executes the game application and the graphics processing unit renders the game screen of the game based on the game application to cause the game to progress, and other use forms in which the executing unit executes processing relating to a game executed by using a portable terminal that communicates with the game device and the graphics processing unit executes processing different from rendering processing, wherein the other use forms include a task processing form in which the executing unit processes a partial task of a game application executed in the portable terminal and transmits a processing result of the partial task to the portable terminal, the executing unit causes the graphics processing unit to execute at least rendering processing of rendering the game screen if the game device is used in the independent use form, the executing unit causes the graphics processing unit to execute at least arithmetic processing included in the partial task if the game device is used in the task processing form, and wherein the executing unit processes the partial task by using a processing program acquired from the portable terminal.

7. The control method according to claim 6, wherein the other use forms include a cooperative processing form in which the executing unit executes the game application and transmits rendering information to the portable terminal to cause the portable terminal to render the game screen and cause the game to progress, the executing unit causes the graphics processing unit to execute at least rendering processing of rendering the game screen if the game device is used in the independent use form, and the executing unit causes the graphics processing unit to execute partial arithmetic processing in processing based on the game application if the game device is used in the cooperative processing form.

8. A control program executed by a game device having an executing unit that executes a game application and a graphics processing unit capable of rendering a game screen of a game based on the game application, the control program for the game device comprising:

by a switching unit, switching an operating state of the game device among an independent use form in which the executing unit executes the game application and the graphics processing unit renders the game screen of the game based on the game application to cause the game to progress, and other use forms in which the executing unit executes processing relating to a game executed by using a portable terminal that communicates with the game device and the graphics processing unit executes processing different from rendering processing, wherein the other use forms include a task processing form in which the executing unit processes a partial task of a game application executed in the portable terminal and transmits a processing result of the partial task to the portable terminal, the executing unit causes the graphics processing unit to execute at least rendering processing of rendering the game screen if the game device is used in the independent use form, the executing unit causes the graphics processing unit to execute at least arithmetic processing included in the partial task if the game device is used in the task processing form, and wherein the executing unit processes the partial task by using a processing program acquired from the portable terminal.

9. The control program according to claim 8, wherein the other use forms include a cooperative processing form in which the executing unit executes the game application and transmits rendering information to the portable terminal to cause the portable terminal to render the game screen and cause the game to progress, the executing unit causes the graphics processing unit to execute at least rendering processing of rendering the game screen if the game device is used in the independent use form, and the executing unit causes the graphics processing unit to execute partial arithmetic processing in processing based on the game application if the game device is used in the cooperative processing form.

* * * * *